Jan. 16, 1968  T. Y. PALMER ETAL  3,364,351
METHOD AND APPARATUS FOR DETECTING AND MEASURING WATER
VAPOR AND OXYGEN IN THE AMBIENT ATMOSPHERE
Filed June 10, 1964  2 Sheets-Sheet 1

INVENTORS
THOMAS Y. PALMER
WILLIAM G. TANK
BY
Erwin F. Adams
ATTORNEY

Jan. 16, 1968   T. Y. PALMER ETAL   3,364,351
METHOD AND APPARATUS FOR DETECTING AND MEASURING WATER
VAPOR AND OXYGEN IN THE AMBIENT ATMOSPHERE
Filed June 10, 1964   2 Sheets-Sheet 2

INVENTOR.
THOMAS Y. PALMER
WILLIAM G. TANK
BY
Erwin F. Adams
ATTORNEY

United States Patent Office 3,364,351
Patented Jan. 16, 1968

3,364,351
METHOD AND APPARATUS FOR DETECTING AND MEASURING WATER VAPOR AND OXYGEN IN THE AMBIENT ATMOSPHERE
Thomas Y. Palmer, Seattle, and William G. Tank, Bellevue, Wash., assignors to The Boeing Company, Seattle, Wash., a corporation of Delaware
Filed June 10, 1964, Ser. No. 374,063
2 Claims. (Cl. 250—43.5)

This invention relates to a method and apparatus for sampling constituents of a gas mixture and more particularly to a method and apparatus for sampling the constituents of air.

Infrared gas analysis has previously been employed in laboratories for the detection of various gas mixture constituents. There are, however, many important advantages which will be derived from the infrared analysis of air to determine the constituents thereof. For example, an infrared apparatus which can measure the water vapor content of air can be used as a hygrometer to study the evaporation rate of various soil surfaces which would be useful for government agricultural agencies. Similarly, a water resources agency could use the apparatus to measure evaporation rates over reservoirs. Another possible governmental agency use would be to employ the apparatus as a hygrometer to monitor humidity over forested areas as an index of fire danger. Besides utility as an apparatus which measures water vapor content, the infrared apparatus could be used to study and monitor air pollution over urban areas or as a toxic effluent monitoring system at rocket test sites.

Another use for this apparatus would be to employ it as a refractometer in conjunction with light and microwave ranging devices. The accuracy of measurement of distance by optical or microwave ranging devices is a function of how well the speed of propagation of the electromagnetic energy over the distance to be measured is known. This propagation speed is a function of the refractive index of the atmosphere. The refractive index, in turn, is a function of dry air density and atmospheric humidity. Accurate average (over the distance-measuring propagation path) values of these two atmospheric variables, which may be obtained from measurements of atmospheric oxygen and water vapor contents, are thus mandatory for precise distance measurement by the ranging devices mentioned.

The basic principle of gas sampling by infrared analysis involves a comparison of infrared radiation intensities received at two wavelengths, one which is sensitive to radiation absorption by the particular constituent desired to be measured and the other which is unaffected by this constituent. It is apparent, therefore, that the gas which is sampled must be precisely the same gas through which both the sensitive and nonsensitive infrared beams pass. One of the prior art techniques for gas sampling was to use two separate infrared beams and simultaneously measure their intensity over the same distance. The inherent error in this technique arises from the fact that each radiation beam passes through different gas volumes. An alternative prior art technique is to sample sequentially the same infrared beam which passes through the same path in the gas; however, spurious error signals may arise in this technique due to changing amounts of dust, haze or smoke in an air transmission path of considerable length with the passing of time.

Accordingly, it is an object of the present invention to provide a method and apparatus for detecting the presence of constituents in a gas propagation path by simultaneous sampling of selective wavelength bands of a single infrared radiation beam to determine absorption.

It is another object of the present invention to provide a method and apparatus for detecting the average humidity and dry-air density of an atmospheric path by simultaneous sampling of wavelength bands at which water vapor and oxygen exhibit absorption of an infrared radiation beam to determine absorption of the beam.

It is still another object of the present invention to provide a method and apparatus for detecting the average humidity and dry-air density of an atmospheric path by simultaneous splitting of a collected beam of infrared radiation into three components and isolating a narrow wavelength band from each component one of which is centered at a wavelength at which water vapor exhibits absorption, a second centered at a band at which oxygen exhibits absorption and a third centered at a wavelength at which neither oxygen nor water vapor exhibit absorption and measuring the absorption of the infrared beam in each of these bands.

It is yet another object of the present invention to provide a method and apparatus for detecting the presence of oxygen in an atmospheric path having a distance of at least one-tenth mile by determining the absorption of an infrared radiation beam at a wavelength band centered about 1.2683 microns.

A further object of the present invention is to provide an apparatus for detecting the presence of a given atmospheric constituent comprising infrared radiation transmitting means, receiving means spaced apart from the transmitting means including means for simultaneously splitting the received beam into at least two components, means for isolating a narrow wavelength band from each collected beam component and means for measuring the electrical signals produced by the detecting means.

Yet another object of the present invention is to provide a device for expressing the amount of a given atmospheric constituent in terms of the ratio of band energies received simultaneously at two infrared wavelengths by means including logarithmic amplifiers.

For a better understanding of the invention, together with other and further objects thereof, references should now be made to the following detailed description which is to be read in conjunction with the accompanying drawings in which.

Generally, in accord with one embodiment of our invention, a method and apparatus is provided for transmitting a beam of infrared radiation from a suitable source through the atmosphere to a receiver where the beam subsequently is simultaneously split into at least two components, from each of which is isolated a narrow wavelength band centered at a wavelength at which an atmospheric constituent desired to be detected will be absorbed and at least one of the other bands centered at a wavelength at which the desired constituent exhibits little or no absorption and subsequently measuring the relative intensity of the bands.

A preferred embodiment of the invention provides a receiver means which simultaneously splits a single beam of received infrared radiation into at least two components and filtering each component to obtain a narrow wavelength band the intensity of which may be converted to an electrical signal and appropriate circuitry for measuring and comparing the intensity of the signals so as to effect sampling at different wavelengths. Since only a single beam of infrared radiation is analyzed and since the sample wavelength band which exhibits absorption of the constituent desired to be measured and the reference sample, i.e. the sample which is not affected by absorption of the desired constituent, are simultaneously taken out of the received beam, it follows that an extremely accurate detection of the desired constituent may be performed without being affected by a change in the medium through which the beam is transmitted with the passing of time.

Figure 1:
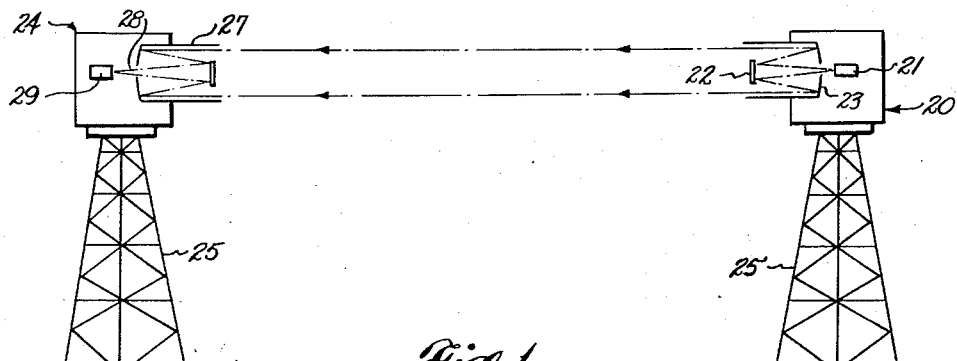
FIGURE 1 is a side elevation view of apparatus for sampling gas constituents in accordance with the present invention.
Figure 2:
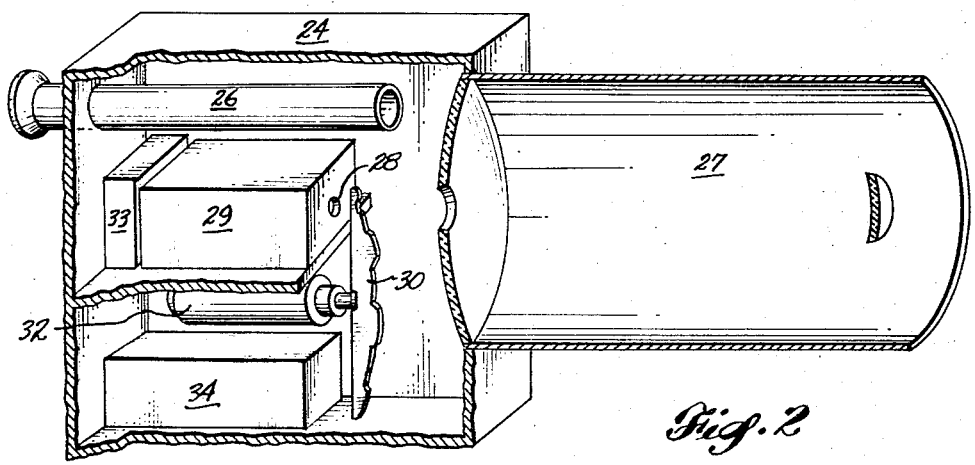
FIGURE 2 is a perspective view of a receiver of an apparatus in accordance with the present invention.

Referring now to FIGURE 1, an apparatus for sampling of atmospheric constituents is shown. Means 20 for transmitting an infrared radiation beam is shown having a source 21 which directs a beam by means of mirrors 22 and 23 along an atmospheric path in the direction of a receiving means 24. The receiving means 24 and the transmitting means 20 are separated by a distance which may be as much as 20 miles and are mounted on towers or structures 25. An alignment telescope such as 26 may be mounted in both the receiving and transmitting means so as to align their optical axes. The receiving means 24 comprises a receiver optics system 27 which focuses the beam through a single field stop aperture 28 into a detecting means 29. Prior to entering the detecting means 29, as seen best in FIGURE 2, a mechanical chopper 30 driven by a motor 32 chops the received beam of radiation. Such chopping permits subsequent utilization of A.C. electronic components in the system read-out. Also mounted within the receiving means 24 are detector preamplifiers 33 which are powered by a source 34 for amplifying the electrical signals produced by detection means.

Figure 3:
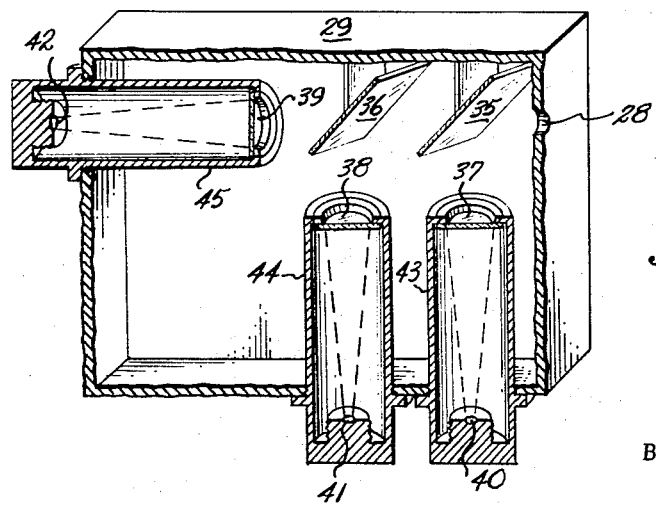
FIGURE 3 is a perspective detailed view of the detector mounted in the receiver shown in FIGURE 2, in accordance with the present invention.

The detecting means 29 comprises two mirror beam splitters 35 and 36, as may be seen in FIGURE 3. Mirror 35 directs one-third of the beam sampled onto a filter 37. The remaining two-thirds of the radiation sample is directed onto mirror 36 which directs one-half of the beam onto a filter 38 and allows the other portion of the beam to be directed onto a filter 39. The mirrors 35 and 36, therefore, simultaneously split one sample of the received radiation beam into three substantially equal components which are directed onto individual filters. The filters 37, 38 and 39 isolate or pass energy band centered at particular wavelengths. The filtered component energy bands are then concentrated onto and spread evenly over detection means, such as lead sulfide cell detectors 40, 41 and 42. Both the filters and the lead sulfide cell detectors for each particular energy band to be passed are mounted in mixer cones 43, 44 and 45. It is to be understood that the mirror beam splitter system, and the number of filters and lead sulfide detectors, will depend upon the number of desired constituents to be measured. In other words, if only a single constituent is desired to be measured, a single mirror which splits the beam into two, preferably equal, components may be used and each of the components directed through a filter onto a lead sulfide detector; one of the components will be used for a reference band and the other for a band commensurate with the constituent desired to be measured.

Figure 4:
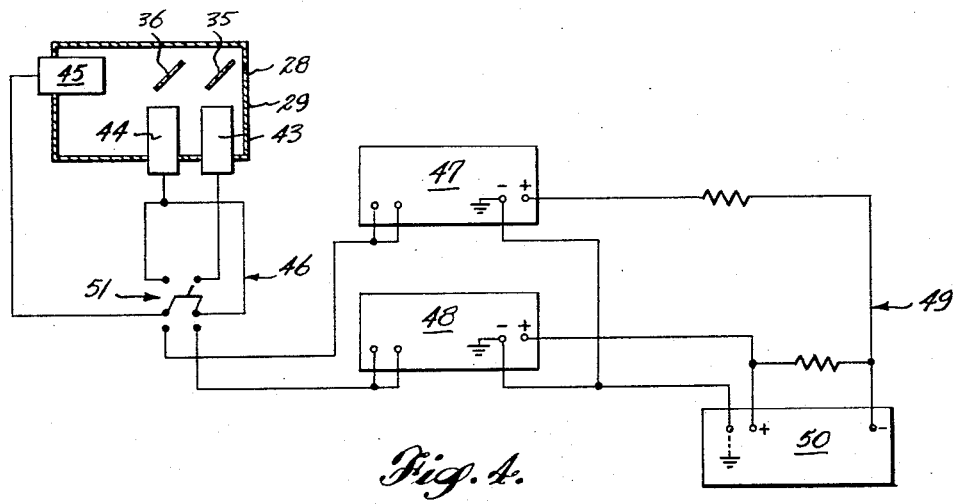
FIGURE 4 is a schematic circuit diagram of the readout for the detecting means of the apparatus in accordance with the present invention.

Signals from the lead sulfide cells mounted in cones 43, 44 and 45 are transmitted through appropriate circuitry 46 to logarithmic converters 47 and 48 shown in FIGURE 4. The converters are electrically coupled through circuit means 49 to a recording potentiometer 50. The recorded signal is proportional to the logarithm of the ratio of two detector input signals. Which of the two desired ratios is sensed and recorded is determined by the position of the double pole, double throw switch 51. It should be appreciated that signals from the detectors can be measured by any suitable means, such as a deflection bridge or known method; but that the logarithmic converters in combination with the recording potentiometer yields a particularly novel, simple and accurate readout system. Also, by using the mirror beam splitters and narrow band-pass filters rather than an echelette grating for isolation of wavelength bands, simultaneous rather than sequential sampling may be used since an echelette grating requires a complicated mechanical linkage to reposition the grating between readings. Moreover, there are no moving parts in the inventive apparatus either in the wavelength band isolation system or in the readout system.

Figure 5:
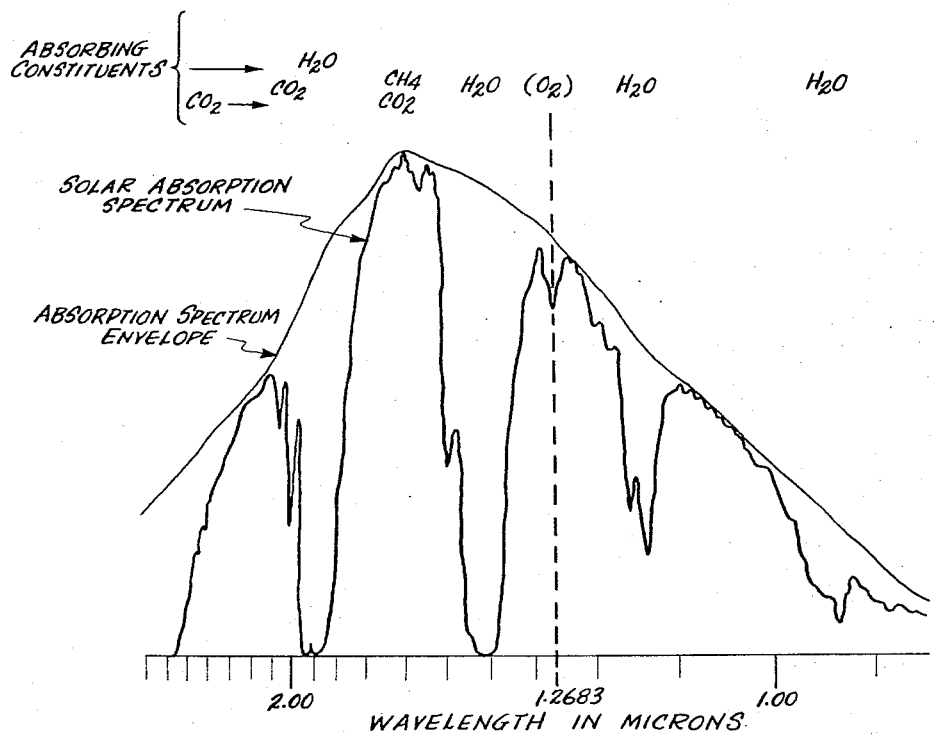
FIGURE 5 is a chart showing the location in the infrared spectrum of some of the absorption bands of a few of the more common gases.

The selection of particular infrared spectral bands which are separated from each beam component and which serve as sensing and reference bands depends upon the constituents which are desired to be measured. As an illustrative example, this device may be used to provide a refractive index to enable the accurate measurement of distance by optical or microwave ranging devices. In optical or microwave distance measuring devices, it is necessary that the propagation speed of electromagnetic energy be known. The speed of propagation is dependent upon the refractive index of the atmosphere and this index is a function of the average humidity and dry-air density of the atmosphere. Humidity and dry-air density measurements are provided by measurements of atmospheric water vapor and oxygen contents, respectively. A precise method for measuring these latter variables comprises the transmitting of a collimated beam of infrared radiation over the proposed ranging path (the length of which may be up to twenty miles, a range for which the present method is well-suited). The transmitted energy, received through a single aperture, is simultaneously split into three equal components and from each an energy band centered about a particular wavelength is isolated. One band is centered at a wavelength at which oxygen absorbs or attenuates infrared radiation, such as 1.2683 microns, so that the intensity of the filtered component passed through this band will be sensitive to the amount of oxygen in the infrared beam path. While it has been maintained at various times that there exists no absorption band for oxygen in the infrared spectrum, investigation and experimentation have proved contrariwise. See, for example, Gates, D. M., "Near Infrared Atmospheric Transmission to Solar Radiation," Journal of the Optical Society of America, vol. 50, No. 12, pages 1299–1304, December 1960. As seen from the graph of FIGURE 5, a weak oxygen absorption line does exist at a wavelength of 1.2683 microns which can be used advantageously in long-path infrared radiation measuring. Radiation in the 1.2683 micron oxygen band, however, is also absorbed by water vapor. This unwanted effect is eliminated by referencing this band to a second band centered at a wavelength of 1.72 microns, a band subject to absorption by water vapor, and only water vapor, to the same degree as is the 1.2683 micron band. The ratio of these two band energies as provided by the system read-out is thus sensitive only to the amount of oxygen in the infrared beam. The amount of water vapor in the beam is obtained by referencing the 1.72 micron band to a third band, centered at a wavelength of 2.17 microns, which suffers absorption by neither oxygen nor water vapor. All three band energy intensities are converted to electrical signals. The disproportionate attenuation between the sensing and the appropriate reference bands is comparatively measured, and expressed by the read-out as band energy intensity ratios, to indicate the amounts of water vapor and oxygen contained in the radiation beam. Because these measurements constitute measurements of the average atmospheric humidity and dry-air density, respectively, the method therefore provides a measure of the atmospheric refractive index. It should be understood that, by proper selection of sensing and reference bands, this method is applicable to the measuring of any gas constituent which exhibits absorption in the infrared spectrum. That is, spurious or unwanted effects in the absorption band of a desired constituent may be negated by referencing said constituent band to a band characterized by identical spurious effects.

We have provided a method and apparatus for sampling gas constituents which exhibit infrared absorption and while the invention has been described in connection with a present, preferred embodiment thereof, it is to be understood that this description is illustrative only and is not intended to limit the invention, the scope of which is defined by the appended claims.

We claim:
1. A method for detecting and measuring the water vapor and oxygen in the ambient atmosphere, comprising the following steps:
   (a) generating infrared radiation;
   (b) collimating the infrared radiation into a relatively narrow beam;
   (c) transmitting the collimated beam through the ambient atmosphere;
   (d) receiving the transmitted beam;
   (e) chopping the received beam;
   (f) focusing the chopped beam;
   (g) splitting the chopped beam into first, second and third components;
   (h) isolating first, second and third relatively narrow wavelength bands from said first, second and third components, respectively; said first wavelength band being centered at a wavelength at which oxygen exhibits infrared radiation absorption, said second wavelength band being centered at a wavelength at which water vapor exhibits infrared radiation absorption, said third wavelength band being centered at a wavelength at which neither oxygen nor water vapor exhibits appreciable infrared radiation absorption;
   (i) producing first, second and third electrical signals proportional to the relative intensity of the infrared radiation of said first, second and third wavelength bands, respectively;
   (j) logarithmically amplifying said first, second and third electrical signals; and
   (k) measuring the difference in relative amplitude between the first and second amplified electrical signals to determine the oxygen content of the ambient atmosphere, and between the second and third amplified electrical signals to determine the water vapor content of the ambient atmosphere.

2. A device for detecting and measuring water vapor and oxygen in the ambient atmosphere, comprising:
   (a) a source of infrared radiation;
   (b) a first reflective optical means disposed adjacent to the infrared radiation source for collimating the infrared radiation into a relatively narrow beam and transmitting the collimated beam through the atmosphere;
   (c) a second reflective optical means spaced from the first reflective optical means for receiving and focusing the transmitted beam;
   (d) chopper means for chopping the beam;
   (e) a first mirror beam splitter for receiving the chopped beam, reflecting a first portion of the chopped beam and transmitting the remainder of the chopped beam;
   (f) a second mirror beam splitter for receiving the remainder of the chopped beam transmitted through the first mirror beam splitter, reflecting a second portion of the chopped beam and transmitting a third portion of the chopped beam;
   (g) first, second and third band pass filters positioned to receive said first, second and third portions of said chopped beam, respectively; said first band pass filter being adapted to isolate a first wavelength band centered at a wavelength at which oxygen exhibits infrared radiation absorption, said second band pass filter being adapted to isolate a second wavelength band centered at a wavelength at which water vapor exhibits infrared radiation absorption, and said third band pass filter being adapted to isolate a third wavelength band centered at a wavelength at which neither oxygen nor water vapor exhibits appreciable infrared radiation absorption;
   (h) first, second and third infrared radiation detectors for receiving said first, second and third wavelength bands, respectively, and producing first, second and third electrical signals proportional to the intensity of the first, second and third wavelength bands, respectively;
   (i) logarithmic amplifying means for selectively amplifying said first, second and third electrical signals from said first, second and third detectors; and
   (j) a recording potentiometer electrically connected to the logarithmic amplifying means for selectively recording the difference in relative amplitude between the first and second amplified electrical signals to determine the oxygen content of the ambient atmosphere, and between the second and third amplified electrical signals to determine the water vapor content of the ambient atmosphere.

References Cited

UNITED STATES PATENTS

| 2,165,214 | 7/1939 | Blau et al. | 250—83.3 |
| 2,974,227 | 3/1961 | Fisher et al. | 250—43.5 |
| 2,993,997 | 7/1961 | McFarlane | 250—203 |
| 3,004,664 | 10/1961 | Dreyfus | 250—43.5 |
| 3,161,768 | 12/1964 | Goulden | 250—43.5 |
| 3,162,761 | 12/1964 | Luft | 250—43.5 |

RALPH G. NILSON, *Primary Examiner.*

A. L. BIRCH, *Assistant Examiner.*